(12) United States Patent
Park et al.

(10) Patent No.: US 11,901,127 B2
(45) Date of Patent: Feb. 13, 2024

(54) DIELECTRIC COMPOSITION AND MULTILAYER CAPACITOR

(71) Applicant: SAMSUNG ELECTRO-MECHANICS CO., LTD., Suwon-si (KR)

(72) Inventors: Jae Sung Park, Suwon-si (KR); Jeong Yun Park, Suwon-si (KR); Hyoung Uk Kim, Suwon-si (KR); Jong Han Kim, Suwon-si (KR); Chung Eun Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 225 days.

(21) Appl. No.: 17/474,510

(22) Filed: Sep. 14, 2021

(65) Prior Publication Data

US 2022/0181081 A1    Jun. 9, 2022

(30) Foreign Application Priority Data

Dec. 7, 2020    (KR) .................. 10-2020-0169870

(51) Int. Cl.
| | |
|---|---|
| H01G 4/12 | (2006.01) |
| H01G 4/30 | (2006.01) |
| C04B 35/468 | (2006.01) |
| H01G 4/248 | (2006.01) |

(52) U.S. Cl.
CPC ....... *H01G 4/1227* (2013.01); *C04B 35/4682* (2013.01); *H01G 4/30* (2013.01); *C04B 2235/3208* (2013.01); *C04B 2235/3215* (2013.01); *C04B 2235/3224* (2013.01); *C04B 2235/3236* (2013.01);

(Continued)

(58) Field of Classification Search
CPC ........ H01G 4/1227; H01G 4/30; H01G 4/248; C04B 35/4682; C04B 2235/3208; C04B 2235/3215; C04B 2235/3224; C04B 2235/3236; C04B 2235/3251; C04B 2235/442

See application file for complete search history.

(56) References Cited

U.S. PATENT DOCUMENTS

2006/0046921 A1*    3/2006  Ito .................. C04B 35/4682
                                                               501/137

FOREIGN PATENT DOCUMENTS

| JP | 3942776 B2 | 7/2007 |
|---|---|---|
| JP | 4572628 B2 | 8/2010 |

(Continued)

*Primary Examiner* — Karl E Group
*Assistant Examiner* — Cameron K Miller
(74) *Attorney, Agent, or Firm* — Morgan, Lewis & Bockius LLP

(57) ABSTRACT

A dielectric composition and a multilayer capacitor including the same are provided. The dielectric composition includes a $BaTiO_3$-base main component, a first subcomponent including an Nb component and a Gd component, a second subcomponent including an Mg component, and a third subcomponent including a Ba component and a Ca component. The first subcomponent is included in an amount of 4 moles or less per 100 moles of the main component. In the first subcomponent, a molar content of Nb and a molar content of Gd satisfy $0.33 \leq Nb/Gd$, and in the third subcomponent, a molar content of Ba and a molar content of Ca satisfy $0.2 \leq Ca/(Ba+Ca)$.

14 Claims, 2 Drawing Sheets

(52) U.S. Cl.
CPC ................. *C04B 2235/3251* (2013.01); *C04B 2235/442* (2013.01); *H01G 4/248* (2013.01)

(56) References Cited

FOREIGN PATENT DOCUMENTS

| | | |
|---|---|---|
| JP | 5017770 B2 | 9/2012 |
| JP | 5035016 B2 | 9/2012 |

\* cited by examiner

DIELECTRIC COMPOSITION AND MULTILAYER CAPACITOR

CROSS-REFERENCE TO RELATED APPLICATION(S)

This application claims benefit under 35 USC 119(a) of Korean Patent Application No. 10-2020-0169870 filed on Dec. 7, 2020 in the Korean Intellectual Property Office, the entire disclosure of which is incorporated herein by reference for all purposes.

BACKGROUND

1. Field

The present disclosure relates to a dielectric composition and a multilayer capacitor.

2. Description of Related Art

A capacitor is a device capable of storing electricity, and basically, when two electrodes are opposed to each other and a voltage is applied thereto, an electrical charge is accumulated in each electrode. When a DC voltage is applied, current flows inside the capacitor while an electrical charge is stored, but when the accumulation is completed, the current does not flow. On the other hand, when an alternating voltage is applied, an alternating current flows while the polarities of the electrodes change.

Depending on the type of insulator provided between the electrodes, such capacitors may be classified into several types, such as aluminum electrolytic capacitors including an electrode of aluminum and having a thin oxide film between the aluminum electrodes, tantalum capacitors using tantalum as an electrode material, ceramic capacitors using a dielectric with a high dielectric constant such as barium titanate, between electrodes, Multilayer Ceramic Capacitors (MLCC) using a high-k ceramic as a dielectric provided between the electrodes in a multilayer structure, and film capacitors using a polystyrene film as a dielectric between electrodes.

In such capacitors, multilayer ceramic capacitors have the advantage of excellent temperature characteristics and frequency characteristics and implemented in a small size, and are thus widely applied in various fields such as high-frequency circuits. Recently, attempts to implement a smaller multilayer ceramic capacitor have continued, and to this end, a dielectric layer and an internal electrode are formed to be thin.

As a method to increase capacity while miniaturizing a multilayer capacitor, the internal electrode is exposed in the width direction of the body, thereby significantly increasing the area of the internal electrode in the width direction through a marginless design. After manufacturing such chips, a process of separately attaching side margins to the electrode exposed surfaces in the width direction of the chip is applied in the completed operation of the process. However, in the case of the side margin construction method, it is difficult to ensure the densification of the side margin itself, and there is a problem that voids or cracks may occur between the interfaces of the laminate and the side margin. Accordingly, there is a need to apply a dielectric material capable of improving the impact resistance and crack resistance of the side margin in ultra-small and high-capacity products.

SUMMARY

This summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

Exemplary embodiments provide a dielectric composition having high reliability and a multilayer capacitor using the same.

According to an exemplary embodiment, a novel dielectric composition is provided. The dielectric composition includes a $BaTiO_3$-base main component, a first subcomponent including an Nb component and a Gd component, a second subcomponent including an Mg component, and a third subcomponent including a Ba component and a Ca component. The first subcomponent is include in an amount of 4 moles or less per 100 moles of the main component. In the first subcomponent, a molar content of Nb and a molar content of Gd satisfy $0.33 \leq Nb/Gd$, and in the third subcomponent, a molar content of Ba and a molar content of Ca satisfy $0.2 \leq Ca/(Ba+Ca)$.

In the second and third subcomponents, a molar content of Mg and the molar contents of Ba and Ca may satisfy $0.2 \leq Mg/(Ba+Ca) < 0.6$.

In the second subcomponent, a molar content of Mg, per 100 moles of the main component, may satisfy $0.5 \leq Mg \leq 1.5$.

A sum of the Nb component and the Gd component of the first subcomponent, per 100 moles of the main component, may be 4 moles or less.

The first subcomponent may satisfy $2 < Nb/Gd$.

According to an exemplary embodiment, a multilayer capacitor includes a body and an external electrode disposed outside of the body. The body includes a laminate including a plurality of dielectric layers and a plurality of internal electrodes stacked with the dielectric layer interposed therebetween, and a side margin portion covering at least one side of side surfaces of the laminate to which the plurality of internal electrodes are exposed. The side margin portion includes a dielectric comprising a $BaTiO_3$-base main component, a first subcomponent including Nb and Gd components, a second subcomponent including an Mg component, and a third subcomponent including Ba and Ca components, wherein the first subcomponent is 4 moles or less per 100 moles of the main component, a molar content of Nb and a molar content of Gd in the first subcomponent satisfy $0.33 \leq Nb/Gd$, and a molar content of Ba and a molar content of Ca in the third subcomponent satisfy $0.2 \leq Ca/(Ba+Ca)$.

The plurality of dielectric layers may include a dielectric which includes a $BaTiO_3$-base main component, a first subcomponent including Nb and Gd components, a second subcomponent including an Mg component, and a third subcomponent including Ba and Ca components. The first subcomponent may be included in the dielectric in an amount of 4 moles or less per 100 moles of the main component, a molar content of Nb and a molar content of Gd in the first subcomponent may satisfy $0.33 \leq Nb/Gd$, and a molar content of Ba and a molar content of Ca in the third subcomponent may satisfy $0.2 \leq Ca/(Ba+Ca)$.

The dielectric of the plurality of dielectric layers and the dielectric of the side margin portion may have the same or different compositions.

BRIEF DESCRIPTION OF DRAWINGS

The above and other aspects, features, and advantages of the present inventive concept will be more clearly understood from the following detailed description, taken in conjunction with the accompanying drawings, in which.

DETAILED DESCRIPTION

Figure 1:
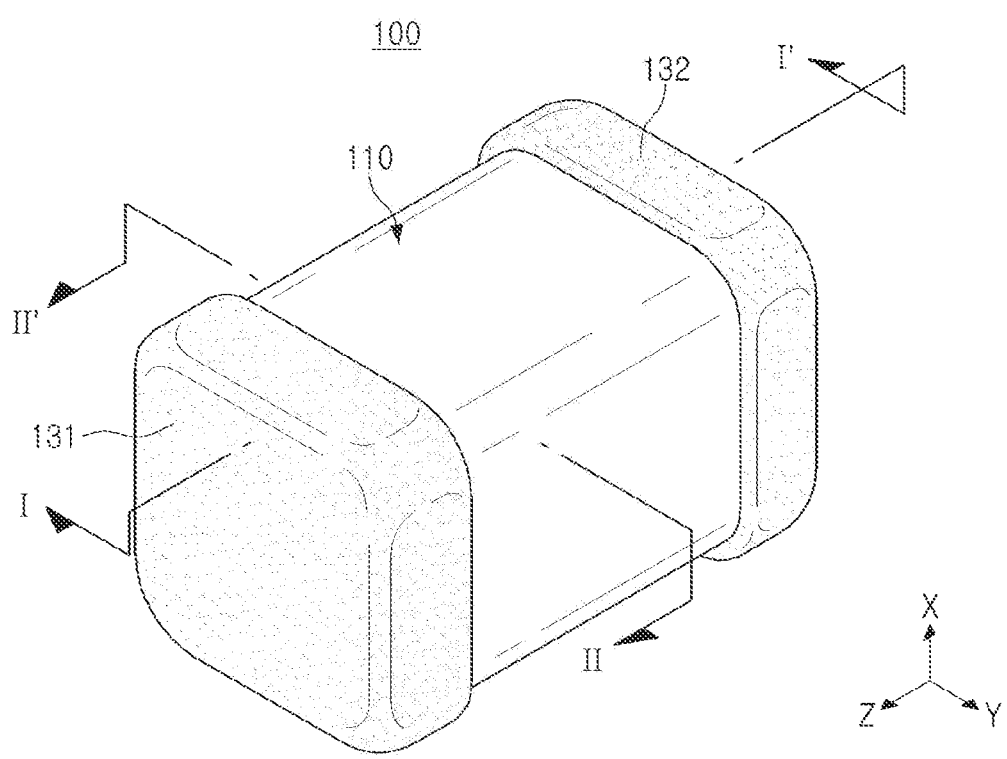
FIG. 1 is a perspective view schematically illustrating the appearance of a multilayer capacitor according to an exemplary embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an embodiment or example, e.g., as to what an embodiment or example may include or implement, means that at least one embodiment or example exists in which such a feature is included or implemented while all examples and examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other manners (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various manners as will be apparent after gaining an understanding of the disclosure of this application. Further, although the examples described herein have a variety of configurations, other configurations are possible as will be apparent after gaining an understanding of the disclosure of this application.

The drawings may not be to scale, and the relative sizes, proportions, and depiction of elements in the drawings may be exaggerated for clarity, illustration, and convenience.

A dielectric composition according to an embodiment includes a $BaTiO_3$-base main component, a first subcomponent including an Nb component and a Gd component, a second subcomponent including an Mg component, and a third subcomponent including a Ba component and a Ca component. The first subcomponent is included in the dielectric composition in an amount of 4 moles or less per 100 moles of the main component. A molar content of Nb and a molar content of Gd of the first subcomponent in the dielectric composition satisfy the condition of $0.33 \leq Nb/Gd$, and a molar content of Ba and a molar content of Ca of the third subcomponent in the dielectric composition satisfy the condition of $0.2 \leq Ca/(Ba+Ca)$. The dielectric composition satisfying the formulae above may be advantageous in densification during sintering, and grain growth may be effectively suppressed. Therefore, reliability may be improved when manufacturing a multilayer capacitor using the dielectric composition. In detail, when the dielectric composition is applied to a side margin portion of the multilayer capacitor, the density, strength characteristics, uniformity of grain size of the side margin portion, and the like may be improved.

In some embodiments, the $BaTiO_3$-base main component may include $BaTiO_3$ and components such as Ca, Zr and Sn dissolved in $BaTiO_3$. The first subcomponent includes Nb and Gd components, and may further include rare earth elements such as Dy, Y, Sm, Tb, Eu, Yb, Er, Lu, or the like. In this case, the first subcomponent may be included in the dielectric composition before sintering, in the form of an oxide or carbonate containing the elements. The content of the first sub-component (e.g., 4 moles or less per 100 mol of the main component) may be the same as the molar content of the elements constituting the first sub-component. For example, the sum of the molar contents of Nb and Gd contained in the first subcomponent may be 4 moles or less per 100 moles of the main component.

The composition of the sub-components in the dielectric composition is determined based on the functions and experimental examples of the main components described below. The sintering of the dielectric composition occurs due to mass transfer between ions, and largely undergoes the operations of densification and grain growth. In this case, densification occurs by surface diffusion of ions, and grain growth occurs by interfacial movement to lower the total surface area. Therefore, there are contradictory aspects in improving density and suppressing grain growth. To satisfy both, it is necessary to increase surface diffusion due to mass transfer of ions while significantly reducing interfacial migration by using a grain boundary segregation effect. Through this technical approach by the inventors of the present disclosure, by adding a specific element that is easily substitutable to the Ba/Ti site to increase the surface diffusion due to the interaction between ions, and in addition, through the grain boundary pinning of defects generated by the defect chemical reaction, the effect of securing densification and suppressing grain growth may be obtained, thereby implementing a uniform microstructure.

When the proportion of Nb in the first subcomponent, in more detail, the molar content ratio (Nb/Gd) of Nb to Gd increases to a predetermined level or more, the density and strength of the sintered body may be improved, and a relatively small and uniform grain size may also be effectively implemented, which may be understood as being due to the size of the ionic radius of the Nb element. Among the rare earth elements substituted for the Ba/Ti site, since the ionic radius of Nb is larger than that of Gd, the solid dissolution may be more effectively performed. In addition, in the process of solid solution of Nb, diffusion of ions is facilitated without precipitation of grain boundaries, and surface diffusion required for densification of ceramics is increased. In addition, cation vacancy is generated in defect chemistry during this process, and these defects may function to suppress grain growth due to interfacial migration.

The second subcomponent includes an Mg component, which may be a variable valence acceptor. In addition to Mg, the second subcomponent may include Mn, Cr, Fe, Co, Cu, Zn, and the like, and may also be included in the dielectric composition before sintering, in the form of oxides or carbonates including these elements. In the case of the Mg component, the density of the ceramic may be improved and grain growth may be suppressed. Ba and Ca components of the third subcomponent may also be included in the dielectric composition before sintering, in the form of oxides or carbonates containing these elements. Ca and Ba components may provide an effect of improving the density and inhibiting grain growth.

On the other hand, the above-described dielectric composition may satisfy more preferable content conditions, and a dielectric having a small, uniform and high-density microstructure may be implemented through selection and ratio adjustment of the above-described main elements. In the case of a multilayer capacitor having the dielectric as above, high temperature/moisture resistance reliability and voltage resistance characteristics may be improved.

First, in the second and third subcomponents, the molar content of Mg and the molar contents of Ba and Ca may satisfy a condition of $0.2 \leq Mg/(Ba+Ca) < 0.6$. In addition, in the second subcomponent, the molar content of Mg, per 100 moles of the main component, may satisfy a condition of $0.5 \leq Mg \leq 1.5$. As described above, Mg functions as a generally known variable valence acceptor, and when the content in the dielectric composition is increased, a vacancy hopping effect between ions may occur due to the generation of oxygen vacancy defects. Accordingly, an effect of improving the density of the ceramic sintered body may be expected, but if a predetermined amount is exceeded, excess Mg ions beyond the solid solution limit may be segregated at the grain boundaries, which may lower the density of the ceramic sintered body. In addition, in the case of the Ba component and the Ca component, by occupying the A site in the $BaTiO_3$ perovskite structure, a difference in the ionic radius and the eutectic temperature may be generated. When the contents of Ba and Ca are increased within a certain range, a low-temperature densification effect may be expected by accelerating liquid phase formation.

On the other hand, the sum of the Nb component and the Gd component of the first subcomponent may be 4 moles or less per 100 moles of the main component. In addition, the first subcomponent may satisfy a condition of 2<Nb/Gd.

Hereinafter, an example of a multilayer capacitor that may be obtained using the above-described dielectric composition will be described.

Figure 2:
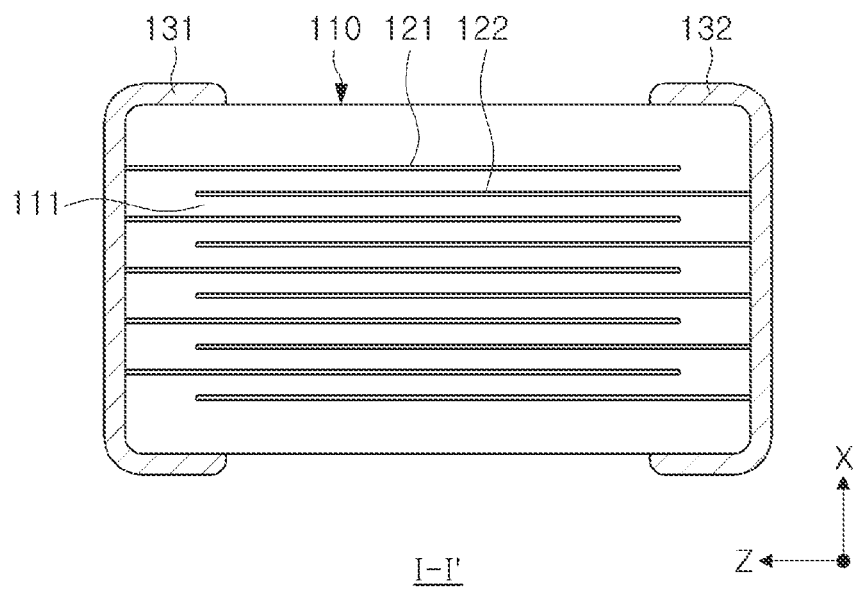
FIG. 2 is a cross-sectional view of the multilayer capacitor of FIG. 1, taken along line I-I'.
Figure 3:
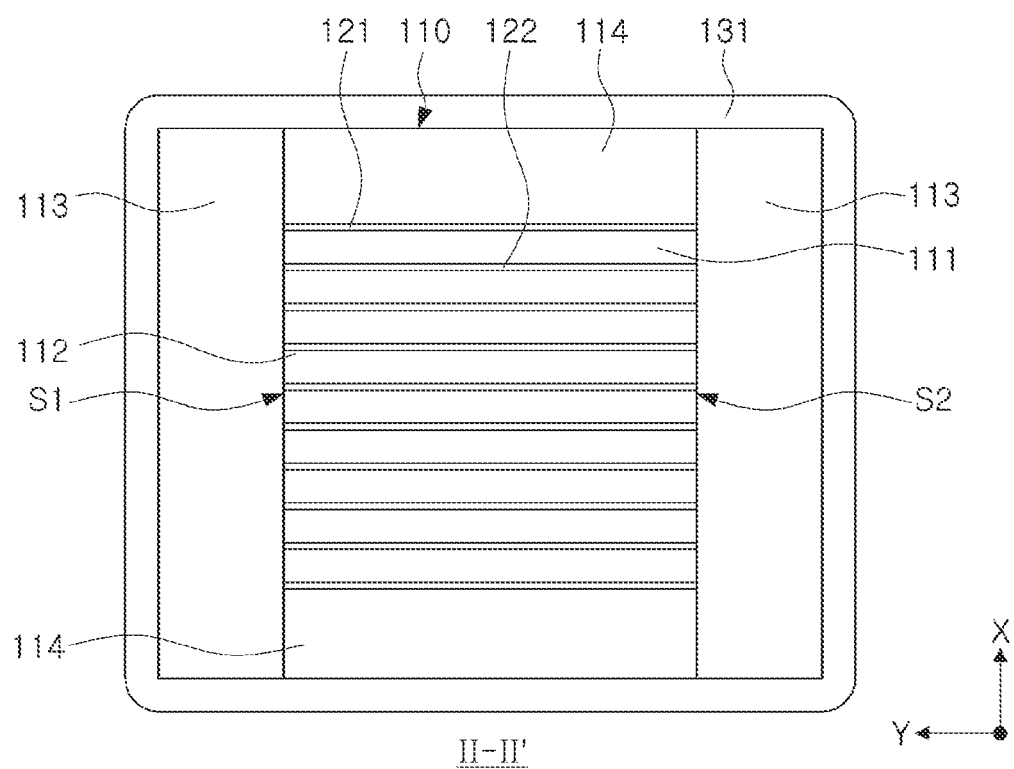
FIG. 3 is a cross-sectional view of the multilayer capacitor of FIG. 1, taken along line II-II'.

FIG. 1 is a perspective view schematically illustrating the appearance of a multilayer capacitor according to an embodiment. FIG. 2 is a cross-sectional view of the multilayer capacitor of FIG. 1, taken along line I-I'. FIG. 3 is a cross-sectional view of the multilayer capacitor of FIG. 1, taken along line II-II'.

Referring to FIGS. 1 to 3, a multilayer capacitor 100 according to an embodiment includes a body 110 and external electrodes 131 and 132. In this case, the body 110 includes a laminate 112 including a plurality of dielectric layers 111 and a plurality of internal electrodes 121 and 122 stacked with the dielectric layer 111 interposed therebetween, and a side margin portion 113 covering at least one of side surfaces of the laminate 112 to which the internal electrodes 121 and 122 are exposed. The side margin portion 113 includes a dielectric which includes a $BaTiO_3$-base main component, a first subcomponent including Nb and Gd components, a second subcomponent including an Mg component, and a third subcomponent including Ba and Ca components. In this case, the first subcomponent is included in an amount of 4 moles or less per 100 moles of the main component, a molar content of Nb and a molar content of Gd in the first subcomponent satisfy the condition of $0.33 \leq Nb/Gd$, and a molar content of Ba and a molar content of Ca in the third subcomponent satisfy the condition of $0.2 \leq Ca/(Ba+Ca)$. The densification, strength characteristics, and uniformity of grain size may be relatively excellent. In addition to these composition conditions, the dielectric of the side margin portion 113 may satisfy all of the content conditions of the dielectric composition described above.

The laminate 112 includes a multilayer structure in which the plurality of dielectric layers 111 are stacked in a first direction (X direction), and may be obtained, for example, by stacking a plurality of green sheets and then sintering the stacked green sheets. Through this sintering process, the plurality of dielectric layers 111 may have an integrated form. The laminate 112 corresponds to an active region including the plurality of internal electrodes 121 and 122 to form a capacitance, and may include a cover portion 114 without the plurality of internal electrodes 121 and 122. The dielectric layer 111 included in the laminate 112 may include the same dielectric as the dielectric of the side margin portion 113, for example, includes a dielectric, which includes a $BaTiO_3$-base main component, a first subcomponent including Nb and Gd components, a second subcomponent including an Mg component, and a third subcomponent including Ba and Ca components, and in which the first subcomponent is included in an amount of 4 moles or less per 100 moles of the main component, a molar content of Nb and a molar content of Gd in the first subcomponent satisfy the condition of $0.33 \leq Nb/Gd$, and a molar content of Ba and a molar content of Ca in the third subcomponent satisfy the condition of $0.2 \leq Ca/(Ba+Ca)$. However, the dielectrics of the dielectric layer 111 and the side margin portion 113 may also have different compositions. In addition, if necessary, the dielectric layer 111 may further include an additive, an organic solvent, plasticizer, a binder, a dispersant and the like.

As in the illustrated form, the side margin portion 113 may be disposed on surfaces S1 and S2 of the laminate 112 perpendicular to the second direction (Y direction), and the second direction (Y direction) is a direction perpendicular to the first direction (X direction) and is also perpendicular to the third direction (Z direction), which is the direction in which the external electrodes 131 and 132 face each other. The side margin portion 113 may be attached to the side surface of the laminate 112 to which the internal electrodes 121 and 122 are exposed, in an operation before sintering after the laminate 112 is manufactured. In this case, unlike the laminate 112, the side margin portion 113 may have a relatively low packing density of ceramic particles for reasons such as not separately undergoing a pressing process. In this embodiment, the dielectric composition having the above-described composition conditions is applied to the side margin portion 113, and thus, after sintering, the dielectric may have excellent densification and fine and uniform crystal grains.

The plurality of internal electrodes 121 and 122 may be obtained by printing a paste containing a conductive metal with a predetermined thickness on one surface of a ceramic green sheet and then sintering the green sheet. In this case, as illustrated in FIG. 2, the plurality of internal electrodes 121 and 122 may include first and second internal electrodes 121 and 122 exposed to ends of the body 110 facing each other in the third direction (Z direction). The first and second internal electrodes 121 and 122 are connected to different external electrodes 131 and 132 to have different polarities when driven, and may be electrically separated from each other by the dielectric layer 111 disposed therebetween. However, the number of the external electrodes 131 and 132 or a connection method thereof to the internal electrodes 121 and 122 may be changed depending on embodiments. Examples of main constituent materials of the internal electrodes 121 and 122 may include nickel (Ni), copper (Cu), palladium (Pd), silver (Ag), and the like, and alloys thereof may also be used.

The external electrodes 131 and 132 are formed outside of the body 110 and may include first and second external electrodes 131 and 132 connected to the first and second internal electrodes 121 and 122, respectively. The external electrodes 131 and 132 may be formed by a method of preparing a material containing a conductive metal as a paste and then applying the paste to the body 110, or the like. Examples of the conductive metal may include nickel (Ni), copper (Cu), palladium (Pd), gold (Au), or alloys thereof. In this case, the external electrodes 131 and 132 may additionally include a plating layer including Ni, Sn, or the like.

On the other hand, the components of the above-described dielectric applied to the multilayer capacitor may be analyzed, for example, by the following method. In the case of a destructive method, the multilayer capacitor is pulverized and the internal electrode is removed, and then the dielectric part is selected. Dielectric components of the selected dielectric may be analyzed using a device such as Inductively Coupled Plasma Spectroscopy (ICP-OES), Inductively Coupled Plasma Mass Spectrometry (ICP-MS), or the like. In the case of the non-destructive method, the component may be analyzed on the center of the chip using TEM-EDS.

Hereinafter, an exemplary embodiment of the present disclosure will be described in more detail through experimental examples performed by the inventors of the present disclosure, but this is to aid in a detailed understanding of the present disclosure, and the scope of the present disclosure is not limited by the experimental examples.

The main component of the base material was 70 nm grade $BaTiO_3$ powder, and a detailed composition of the subcomponent is illustrated in Table 1 below. When preparing the ceramic slurry, the base material main component and subcomponent powder were mixed/dispersed using zirconia balls, and ethanol/toluene and a dispersant were mixed, followed by mechanical milling. In addition to the main component and subcomponent, a sintering aid component including Si, Al, Na, Li, or the like was added. In addition, a binder mixing process was added to increase the strength of the dielectric sheet. A ceramic green sheet for a laminate was formed using the prepared slurry, and a paste for an internal electrode was applied thereon, to be manufactured to have a thickness of about 10-20 μm using an on-roll forming coater of a head ejection method. The formed sheet as above was attached to the exposed portion of the internal electrode of the laminate. On the other hand, in the case of the samples in Table 1, the content of the subcomponent represents the molar content added, based on 100 moles of the main component of $BaTiO_3$, and the components of Nb, Gd, Mg, Ba, and Ca were added in the forms of $Nb_2O_5$, $Gd_2O_3$, $MgCO_3$, $BaCO_3$, and $CaCO_3$, respectively. Therefore, in a case in which the Nb component and the Gd component are present in an ionic form in the sintered body, the contents thereof may be twice the amount of each oxide added. For example, when 1 mole of $Nb_2O_5$ is added, 2 moles of the Nb component are present in the ceramic sintered body.

TABLE 1

|    | $Nb_2O_5$ | $Gd_2O_3$ | $MgCO_3$ | $BaCO_3$ | $CaCO_3$ | Ca/(Ba + Ca) | Mg/(Ba + Ca) |
|----|-----------|-----------|----------|----------|----------|--------------|--------------|
| 1  | 0.0       | 2.0       | 0.5      | 2.0      | 0.5      | 0.20         | 0.20         |
| 2  | 0.5       | 1.5       | 0.5      | 2.0      | 0.5      | 0.20         | 0.20         |
| 3  | 1.0       | 1.0       | 0.5      | 2.0      | 0.5      | 0.20         | 0.20         |
| 4  | 1.5       | 0.5       | 0.5      | 2.0      | 0.5      | 0.20         | 0.20         |
| 5  | 2.0       | 0.0       | 0.5      | 2.0      | 0.5      | 0.20         | 0.20         |
| 6  | 0.0       | 2.0       | 1.0      | 2.0      | 0.5      | 0.20         | 0.40         |
| 7  | 0.5       | 1.5       | 1.0      | 2.0      | 0.5      | 0.20         | 0.40         |
| 8  | 1.0       | 1.0       | 1.0      | 2.0      | 0.5      | 0.20         | 0.40         |
| 9  | 1.5       | 0.5       | 1.0      | 2.0      | 0.5      | 0.20         | 0.40         |
| 10 | 2.0       | 0.0       | 1.0      | 2.0      | 0.5      | 0.20         | 0.40         |
| 11 | 0.0       | 2.0       | 1.5      | 2.0      | 0.5      | 0.20         | 0.60         |
| 12 | 0.5       | 1.5       | 1.5      | 2.0      | 0.5      | 0.20         | 0.60         |
| 13 | 1.0       | 1.0       | 1.5      | 2.0      | 0.5      | 0.20         | 0.60         |
| 14 | 1.5       | 0.5       | 1.5      | 2.0      | 0.5      | 0.20         | 0.60         |
| 15 | 2.0       | 0.0       | 1.5      | 2.0      | 0.5      | 0.20         | 0.60         |
| 16 | 0.0       | 2.0       | 1.0      | 0.5      | 2.0      | 0.80         | 0.40         |
| 17 | 0.5       | 1.5       | 1.0      | 0.5      | 2.0      | 0.80         | 0.40         |
| 18 | 1.0       | 1.0       | 1.0      | 0.5      | 2.0      | 0.80         | 0.40         |
| 19 | 1.5       | 0.5       | 1.0      | 0.5      | 2.0      | 0.80         | 0.40         |
| 20 | 2.0       | 0.0       | 1.0      | 0.5      | 2.0      | 0.80         | 0.40         |

The ceramic laminate in the form of a green chip, which was prepared as described above, was subjected to a binder burn-out process in a nitrogen atmosphere at 400° C. or less and was fired at a sintering temperature of 1200° C. or less and a hydrogen concentration of 0.5% or less of H2. Then, the obtained samples were measured for electrical properties, insulation resistance, chip strength, grain size and density difference of the side margin portion. In detail, the room temperature capacitance and dielectric loss of respective samples were measured at 1 kHz and AC 0.5V using an LCR meter, and breakdown voltage (BDV) at which insulation breakdown occurs was measured. The strength of the side margin portion of the chip was measured under conditions of a load of 5 kgf and a holding time of 5 seconds using a Vickers hardness tester. In addition, the density, average grain size, and uniformity of the side margin portion were measured for the fractured surface and the polished surface of the chip. Table 2 below illustrates the structural characteristics of the side margin portion, and Table 3 illustrates the electrical characteristics, and the criteria for respective symbols are as follows.

⊚: Excellent, ○: Good, Δ: Normal, X: Boor

TABLE 2

| | Side margin density | Side margin strength | Grain size (nm) | Grain size Uniformity |
|---|---|---|---|---|
| 1 | X | X | 450 | X |
| 2 | X | Δ | 428 | X |
| 3 | Δ | ○ | 410 | X |
| 4 | ○ | ⊚ | 382 | Δ |
| 5 | ⊚ | ⊚ | 360 | Δ |
| 6 | Δ | Δ | 410 | Δ |
| 7 | Δ | Δ | 392 | Δ |
| 8 | ○ | ○ | 378 | Δ |
| 9 | ○ | ○ | 320 | ○ |
| 10 | ⊚ | ○ | 298 | ○ |
| 11 | X | X | 362 | Δ |
| 12 | X | X | 340 | Δ |
| 13 | Δ | Δ | 312 | ○ |
| 14 | Δ | Δ | 280 | ○ |
| 15 | Δ | Δ | 244 | ⊚ |
| 16 | Δ | Δ | 271 | ○ |
| 17 | ○ | Δ | 250 | ○ |
| 18 | ⊚ | ⊚ | 192 | ⊚ |
| 19 | ⊚ | ⊚ | 160 | ⊚ |
| 20 | ○ | ○ | 110 | ⊚ |

TABLE 3

| | Room temperature withstand voltage | High temperature reliability | Moisture resistance reliability |
|---|---|---|---|
| 1 | X | X | X |
| 2 | Δ | Δ | X |
| 3 | ○ | ○ | Δ |
| 4 | ○ | ○ | Δ |
| 5 | Δ | ⊚ | ○ |
| 6 | Δ | Δ | Δ |
| 7 | Δ | Δ | Δ |
| 8 | Δ | Δ | ○ |
| 9 | Δ | ○ | ○ |
| 10 | X | ○ | ○ |
| 11 | X | X | X |
| 12 | X | X | X |
| 13 | Δ | Δ | Δ |
| 14 | X | Δ | Δ |
| 15 | X | Δ | ○ |
| 16 | X | X | Δ |
| 17 | ○ | X | ○ |
| 18 | ⊚ | ⊚ | ⊚ |
| 19 | ⊚ | ⊚ | ⊚ |
| 20 | Δ | ○ | ○ |

According to the above experimental results, when the condition of 0.33≤Nb/Gd and the condition of 0.2≤Ca/(Ba+Ca) are simultaneously satisfied, the densification of the side margin portion may be excellent, and the size of the grains may be refined and also be uniform. Accordingly, reliability such as withstand voltage characteristics of the multilayer capacitor may be improved.

As set forth above, in the case of a dielectric composition according to an exemplary embodiment, while being advantageous in densification during sintering, grain growth may be effectively suppressed, and reliability may be improved when the dielectric composition is used in a multilayer capacitor.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A dielectric composition comprising:
    a $BaTiO_3$-base main component;
    a first subcomponent including a niobium (Nb) component and a gadolinium (Gd) component;
    a second subcomponent including a magnesium (Mg) component; and
    a third subcomponent including a barium (Ba) component and a calcium (Ca) component,
    wherein the dielectric composition comprises the first subcomponent in an amount of 4 moles or less per 100 moles of the main component,
    in the first subcomponent, a molar content of Nb and a molar content of Gd satisfy 0.33≤Nb/Gd, and
    in the third subcomponent, a molar content of Ba and a molar content of Ca satisfy 0.2≤Ca/(Ba+Ca).

2. The dielectric composition of claim 1, wherein in the second and third subcomponents, a molar content of Mg and the molar contents of Ba and Ca satisfy 0.2≤Mg/(Ba+Ca)<0.6.

3. The dielectric composition of claim 1, wherein in the second subcomponent, a molar content of Mg, per 100 moles of the main component, satisfies 0.5≤Mg≤1.5.

4. The dielectric composition of claim 2, wherein in the second subcomponent, the molar content of Mg, per 100 moles of the main component, satisfies 0.5≤Mg≤1.5.

5. The dielectric composition of claim 1, wherein a sum of the molar contents of Nb and Gd of the first subcomponent, per 100 moles of the main component, is 4 moles or less.

6. The dielectric composition of claim 1, wherein the molar content of Nb and the molar content of Gd in the first subcomponent satisfies 2<Nb/Gd.

7. A multilayer capacitor comprising:
a body and an external electrode disposed outside of the body,
wherein the body includes a laminate including a plurality of dielectric layers and a plurality of internal electrodes stacked with the dielectric layer interposed therebetween, and a side margin portion covering at least one side of side surfaces of the laminate to which the plurality of internal electrodes are exposed, and
the side margin portion includes a dielectric comprising:
a $BaTiO_3$-base main component: a first subcomponent including niobium (Nb) and gadolinium (Gd) components; a second subcomponent including an Mg component; and a third subcomponent including a barium (Ba) component and a calcium (Ca) component,
wherein the dielectric comprises the first subcomponent in an amount of 4 moles or less per 100 moles of the main component,
a molar content of Nb and a molar content of Gd in the first subcomponent satisfy 0.33≤Nb/Gd, and
a molar content of Ba and a molar content of Ca in the third subcomponent satisfy 0.2≤Ca/(Ba+Ca).

8. The multilayer capacitor of claim 7, wherein the plurality of dielectric layers include a dielectric comprising: a $BaTiO_3$-base main component; a first subcomponent including Nb and Gd components; a second subcomponent including an Mg component; and a third subcomponent including Ba and Ca components,
wherein the dielectric composition comprises the first subcomponent in an amount of 4 moles or less per 100 moles of the main component,
the molar content of Nb and the molar content of Gd in the first subcomponent satisfy 0.33≤Nb/Gd, and
the molar content of Ba and the molar content of Ca in the third subcomponent satisfy 0.2≤Ca/(Ba+Ca).

9. The multilayer capacitor of claim 7, wherein the dielectric of the plurality of dielectric layers and the dielectric of the side margin portion have different compositions.

10. The multilayer capacitor of claim 7, wherein in the second and third subcomponents, a molar content of Mg and molar contents of Ba and Ca satisfy 0.2≤Mg/(Ba+Ca)<0.6.

11. The multilayer capacitor of claim 7, wherein in the second subcomponent, a molar content of Mg, per 100 moles of the main component, satisfies 0.5≤Mg≤1.5.

12. The multilayer capacitor of claim 10, wherein in the second subcomponent, the molar content of Mg, per 100 moles of the main component, satisfies 0.5≤Mg≤1.5.

13. The multilayer capacitor of claim 7, wherein a sum of the molar contents of Nb and Gd of the first subcomponent, per 100 moles of the main component, is 4 moles or less.

14. The multilayer capacitor of claim 7, wherein the molar content of Nb and the molar content of Gd in the first subcomponent satisfy 2<Nb/Gd.

* * * * *